United States Patent Office

2,884,429
Patented Apr. 28, 1959

2,884,429

ALKALI METAL ENOLATES OF 20-KETO-21 (TRIFLUOROACETYL) STEROIDS

Alan H. Nathan and John A. Hogg, Kalamazoo Township, Kalamazoo County, Mich., assignors to The Upjohn Company, Kalamazoo, Mich., a corporation of Michigan No Drawing. Application December 17, 1954
Serial No. 476,059

20 Claims. (Cl. 260—397.4)

This invention relates to certain 20-keto-21-(trifluoroacetyl)-steroids, alkali-metal enolates thereof, and to a process for the production and use thereof.

It is an object of the present invention to provide novel 20-keto-21-(trifluoroacetyl)-steroids. Another object is the provision of a process for the production of these novel steroids. Another object is the provision of a process for the production of certain 21-(trifluoroacetyl)-progesterones. Still another object is the provision of a process for the conversion of the novel 20-keto-21-(trifluoroacetyl)-steroids to other known and/or physiologically active steroids. Other objects will be apparent to those skilled in the art to which this invention pertains.

The 20-keto-21-(trifluoroacetyl)-steroid compounds of the present invention in their keto form, and the process for their preparation may be represented by the following formulae:

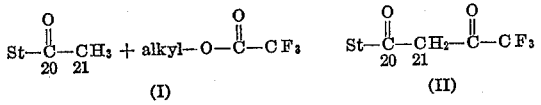

wherein St represents a cyclopentanopolyhydrophenanthrene nucleus, preferably 3-oxygenated, attached to the above-identified side chain at carbon atom 17. The novel compounds of the present invention may or may not have the angular methyl group attached to carbon atom 10 and/or 13 and the steroid nucleus may possess an α-hydroxy or β-hydroxy group, groups hydrolyzable or convertible thereto, e.g., acyloxy groups, arylsulfonyloxy, ether groups, or the like, or ketonic oxygen, at carbon atoms 3 or 11, or groups hydrolyzable or convertible thereto, e.g., a dialkyl ketal, a glycol ketal, an enol acylate, enol ether, or enamine, or the like, at carbon atom 3. Moreover, the steriod nucleus may have a hydrogen, hydroxy group, an oxido group, or a double bond or any other non-interfering group at carbon atom 17 or at any other position of the steroid nucleus.

According to the process of the present invention, a 20-keto-21-(trifluoroacetyl)-steroid of the present invention (II) is prepared by condensing a 17-acetyl steroid (I) with an alkyl ester of trifluoroacetic acid in the presence of an alkali-metal condensation catalyst, under substantially anhydrous conditions, to produce an alkali-metal enolate of a 20-keto-21-(trifluoroacetyl)-steroid of the present invention. Acidification of a solution of the thus-produced alkali-metal enolate is productive of the corresponding free 20-keto-21-(trifluoroacetyl)-steroid.

Preferred compounds of the present invention include those represented, in their keto form, by the following formula:

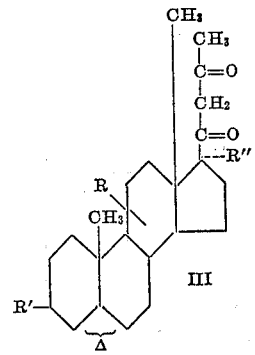

wherein R' represents a 3-(α or β)-hydroxy group, an esterified 3-(α or β)-hydroxy group, an etherified 3-(α or β)-hydroxy group or a ketonic oxygen atom (=O); R, a C-ring-substituent, represents an 11-(α or b)-hydroxy group, an 11-(α or β)-esterified hydroxy group, hydrogen, a 8(11)-double bond, a 9:11-β-oxide, or an 11-ketonic oxygen atom (=O); R'' is hydrogen or a hydroxy group; and Δ represents a double bond at one of the positions 4(5) and 5(6); and alkali-metal enolates thereof.

Especially preferred compounds of the present invention are those compounds represented by Formula II wherein R' is a ketonic oxygen atom, R is an 11α-hydroxy group, an 11β-hydroxy group, or an 11-ketonic oxygen atom, and Δ is a 4(5) double bond.

The compounds of the present invention are useful precursors to both known and new steroids. For example, they can be converted to 21-acyloxy-20-keto compounds or to Δ$^{17(20)}$-21-oic acid esters, as disclosed more fully hereinafter. Such conversions, involving the preferred compounds of the present invention, may be illustrated as follows:

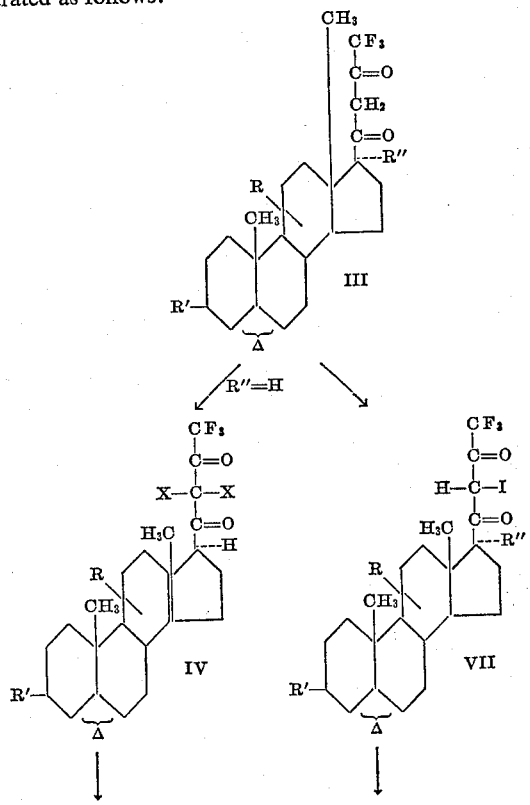

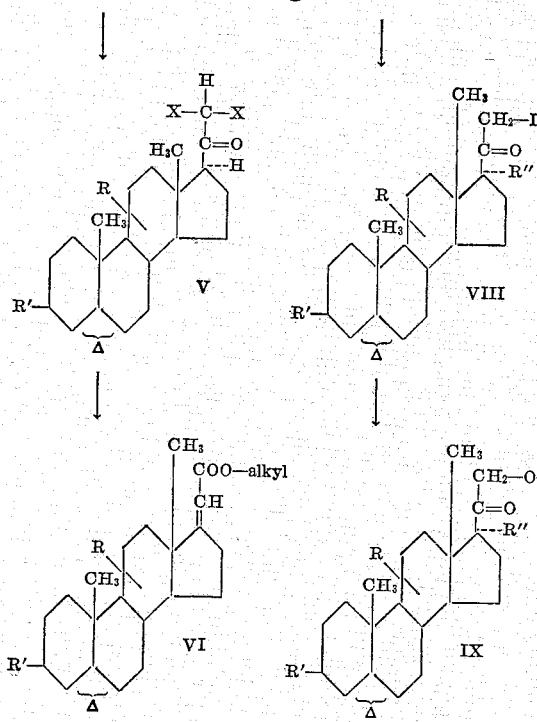

wherein R, R', R'', X and Δ have the values give hereinbefore, X is chlorine, bromine or iodine and Ac is the acyl radical of an organic carboxylic acid.

For example, treatment of 11-keto-21-(trifluoroacetyl)-progesterone or an alkali-metal enolate thereof with about two molar equivalents of bromine in methanol, preferably in the presence of potassium acetate or the like, is productive of 11-keto-21,21-dibromo-21-(trifluoroacetyl)-progesterone, which upon treatment with sodium methoxide in methanol is productive of 3,11-diketo-4,17(20)-pregnadiene-21-acid methyl ester. After protecting the 3-keto group of the latter compound with a glycol ketal or the like, e.g., the 3-ethylene glycol ketal, prepared by reacting 3,11-diketo-4,17(20)-pregnadiene-21-acid methyl ester with ethylene glycol in benzene in the presence of an acid catalyst, said compound is converted, using lithium aluminum hydride in ether followed by mild acid hydrolysis of the 3-ketal group, to 11β,21-dihydroxy-4,17(20)-pregnadiene-3-one. This latter compound or a 21-acyloxy ester thereof can be oxidatively hydroxylated with osmium tetroxide and hydrogen peroxide or other oxidizing agent to the physiologically active 11β,17α,21-trihydroxy-4-pregnene-3,20-dione (Kendall's Compound F) according to methods well known in the art [Prins and Reichstein, Helv. Chim. Acta, 25, 300 (1942); Ruzicka and Mueller, ibid., 22, 755 (1939)].

Alternatively, 11-keto-21-(trifluoroacetyl)-progesterone can be monoiodinated to produce 11-keto-21-iodo-21-(trifluoroacetyl)-progesterone which, when treated with potassium acetate and methanol, first undergoes reversal to produce 11-keto-21-iodoprogesterone which is then converted to 11-keto-21-acetoxyprogesterone (Kendall's Compound A acetate).

Similar reactions designed to convert the novel compounds of the present invention to known and/or physiologically active steroids are described hereinafter.

In carrying out the process of the present invention, a 20-keto steroid, which may be represented by Formula I, is dissolved in an alkanol, or in a solvent which is non-reactive under the conditions of the reaction, and admixed with the selected alkyl trifluoroacetate, especially lower-alkyl trifluoroacetate, in the presence of an alkali-metal condensation catalyst. For example, the selected alkyl ester of trifluoroacetic acid can be admixed with the steroid in the reaction solvent and the mixture maintained at a temperature between about zero degrees centigrade and the boiling point of the reaction mixture, preferably between about twenty and about sixty degrees centigrade, until the reaction is deemed substantially complete, usually between about one-half hour and about three days. When the ketone at carbon atom 20 is the only ketone in the steroid molecule, with the exception of a ketone at carbon atom 11 or other hindered position, the reaction is sometimes advantageously carried out at temperatures substantially above room temperature, e.g., between about forty degrees centigrade and the boiling point of the reaction mixture.

Reaction solvents which can conveniently be employed in the process of the present invention include benzene, toluene, xylene, and like aromatic hydrocarbons, methanol, ethanol, isopropyl alcohol, tertiary butyl alcohol, and other alcohols, tetrahydrofuran, dioxane, diethyl ether, Skellysolve B hexane hydrocarbons and other aliphatic hydrocarbons, mixtures of these solvents, and other essentially non-reactive solvents.

The time necessary to obtain substantially complete reaction varies considerably between about one-half hour and several days, depending upon the reaction solvent, the reaction temperature, the selected alkyl ester of trifluoroacetic acid, and the alkali-metal catalyst employed, the moisture present in the reaction, and the molar ratios of the reactants. When sodium methoxide, methyl or ethyl trifluoroacetate, and tertiary butyl alcohol are employed at fifty degrees centigrade, the reaction is usually more than half completed in fifteen minutes and is usually substantially complete within one or two hours.

The process of the present invention is usually carried out in the absence of any significant amounts of water in any form in the reaction, as would be expected in a reaction of this type. To ensure the essentially complete exclusion of water from the reaction mixture, the solvent is usually carefully dried.

Since the reaction may be somewhat reversible, i.e., the reaction product in the presence of a large amount of methanol or ethanol and a catalytic amount of base may undergo alcoholysis to give starting material, the presence of a large amount of methanol or ethanol in the reaction mixture is usually not desirable although significant amounts of product can be obtained using ethanol as the sole reaction solvent.

Alkali-metal condensation catalysts within the purview of the present invention include the alkali-metal alkoxides, e.g., sodium methoxide, sodium ethoxide, sodium isopropoxide, potassium tertiary butoxide, lithium methoxide, and the like, the alkali metals, the alkali-metal hydrides, alkali-metal amides and alkyl alkali-metals, e.g., sodium amide, triphenyl methyl sodium, and the like. Of these, the alkali-metal alkoxides, especially sodium methoxide and sodium ethoxide, are preferred for their convenience and consistently satisfactory results. The alkali-metal alkoxide may be used solvent-free, dissolved or suspended in a non-reactive solvent, or in situ in the alkanol in which said alkali-metal alkoxide was prepared. When potassium is used, it is usually used as the solution formed by its reaction with tertiary butyl alcohol according to procedure well known in the art. When up to about one molar equivalent of alkali-metal base is employed per mole of starting steroid, the above-described reaction is a selective one, producing only 21-(trifluoroacetylated) product. Use of greater than molar equivalent amounts of alkali-metal condensation catalyst may result in a slight loss of the selective nature of the reaction, although, under practically all conditions, surprisingly, the reaction product is primarily the result of the selective condensation at the 21-position.

If the reaction is forced, e.g., high temperatures, and large molar excesses of alkyl trifluoroacetate and sodium methoxide, a 2,21-di-(trifluoroacetyl) steroid can be isolated as a portion of the reaction product when the starting steroid is a Δ⁴-3,20-diketo steroid unsubstituted in the 2 and 21 positions. These steroids, when they possess a 17α-hydrogen, can be converted to lower-alkyl 3-keto-4,17(20)-pergnadiene - 21 - oates by tribromination followed by rearrangement with sodium methoxide and methanol and then by debromination with zinc and acetic acid.

The presence of substantially greater than one molar equivalent of alkyl ester of trifluoroacetic acid, per mole of starting steroid, is usually advantageous and promotes rapid completion of the reaction. The reaction is therefore usually carried out in the presence of greater than about one molar equivalent of alkyl trifluoroacetate. Alkyl esters of trifluoroacetic acid which are conveniently employed in the process of the present invention include the lower-alkyl esters of trifluoroacetic acid, e.g., methyl trifluoroacetate, ethyl trifluoroacetate, and the propyl, butyl, isobutyl, amyl, hexyl, heptyl, and octyl esters of trifluoroacetic acid, and the like. Since the methyl and ethyl esters of trifluoroacetic acid appear to undergo condensation with the starting steroid the most rapidly, methyl trifluoroacetate and ethyl trifluoroacetate are usually employed.

The thus-produced alkali-metal enolate may be separated by the addition of a large volume of an organic solvent in which the alkali-metal enolate is insoluble, such as ether, pentane, or benzene, for example. Another method of producing a somewhat purer alkali-metal enolate comprises acidification of a cold aqueous solution of the thus-precipitated alkali-metal enolate to precipitate the free enol and then treating a solution of the free enol in ether or benzene with a chemical equivalent of sodium methoxide, thus reprecipitating the sodium enolate.

It was found, when carrying out the process of the present invention with a Δ⁴-3,20-diketo steroid, that the reaction product, instead of being a mixture of products trifluoroacetylated at carbon atoms 2,12 when a ketone is present in the 11 position, or 21, was a steroid trifluoroacetylated only at carbon atom 21.

The compounds of the present invention, i.e., 20-keto-21-(trifluoroacetyl) steroids represented by Formula II, may be isolated and purified as described above, or used without purification or isolation in further synthesis such as, for example, in the production of 21-acyloxy steroids or in the production of Δ¹⁷⁽²⁰⁾-21-acids or esters thereof as described above.

The following examples are illustrative of the process and products of the present invention but are not to be construed as limiting.

EXAMPLE 1

*11-keto-21-(trifluoroacetyl)-progesterone*

To a solution of 6.57 grams (0.02 mole) of 11-ketoprogesterone and 10.57 grams (0.08 mole) of ethyl trifluoroacetate in 100 milliliters of dry benzene was added a solution of 1.08 grams (0.02 mole) of sodium methoxide in forty milliliters of dry benzene containing a trace of ethanol. The mixture was stirred at room temperature for two hours and the resulting turbid solution diluted with 200 milliliters of ether. The resulting precipitate was filtered, dissolved in water, the solution filtered, the aqueous filtrate acidified at ice-bath temperature, and the resulting precipitate of 11-keto-21-(trifluoroacetyl)-progesterone filtered and dried. The sodium enolate was prepared by dissolving the 11-keto-21-(trifluoroacetyl)-progesterone in acetone and adding an equimolar quantity of sodium methoxide thereto.

EXAMPLE 2

*11α-hydroxy-21-(trifluoroacetyl)-progesterone*

Following the procedure described in Example 1, 11α-hydroxyprogesterone is converted to 11α-hydroxy-21-(trifluoroacetyl)-progesterone and its sodium enolate.

11β-hydroxyprogesterone is similarly converted to 11β-hydroxy-21-(trifluoroacetyl)-progesterone and its sodium enolate.

Below is a table of starting steroids for the process of the present invention and their reaction products, when following the reaction conditions described in Example 1.

| Starting Steroid | Reaction Product (and sodium enolate) |
|---|---|
| 1. 3β-hydroxy-5-pregnene-20-one | 1. 21-(trifluoroacetyl)pregnenolone. |
| 2. 3α-hydroxyallopregnane-20-one | 2. 3α - hydroxy - 21 - (trifluoroacetyl) - allopregnanolone. |
| 3. 3β-hydroxy-16:17-oxido-5-pregnene-20-one | 3. 3β-hydroxy-16:17-oxido-21-(trifluoroacetyl)-5-pregnene-20-one. |
| 4. 3β-hydroxy-5,16-pregnadiene-20-one | 4. 3β-hydroxy-21-(trifluoroacetyl)-5,16-pregnadiene-20-one. |
| 5. 3β-acetoxy-5-pregnene-20-one | 5. 21-(trifluoroacetyl)pregnenolone acetate. |
| 6. 3α-hytroxypregnane-20-one | 6. 3α-hydroxy-21-(trifluoroacetyl)pregnane-20-one. |
| 7. 3α-hydroxypregnane-11,20-dione | 7. 3α-hydroxy-21-(trifluoroacetyl)pregnane-11,20-dione. |
| 8. 3α,17α-dihydroxypregnane-20-one | 8. 3α,17α - dihydroxy - 21 - (trifluoroacetyl)pregnane-20-one. |
| 9. 3α-acetoxy-17α-hydroxypregnane-11,20-dione | 9. 3α-acetoxy-17α-hydroxy-21-(trifluoroacetyl)-pregnane-11,20-dione. |
| 10. progesterone | 10. 21-(trifluoroacetyl)progesterone. |
| 11. 11α-acetoxyprogesterone | 11. 11α-acetoxy-21-(trifluoroacetyl)progesterone. |
| 12. 11α-tosyloxyprogesterone | 12. 11α-tosyloxy-21-(trifluoroacetyl)progesterone. |
| 13. Δ⁹⁽¹¹⁾-progesterone | 13. Δ⁹⁽¹¹⁾-21-(trifluoroacetyl)progesterone. |
| 14. 9:11-β-oxidoprogesterone | 14. 9:11-β-oxido-21-(trifluoroacetyl)progesterone. |
| 15. 9:11-α-oxidoprogesterone | 15. 9:11-α-oxido-21-(trifluoroacetyl)progesterone. |
| 16. 16:17-oxidoprogesterone | 16. 16:17-oxido-21-(trifluoroacetyl)progesterone. |
| 17. 17α-hydroxyprogesterone | 17. 17α-hydroxy-21-(trifluoroacetyl)progesterone. |
| 18. 11β,17α-dihydroxyprogesterone | 18. 11β,17α-dihydroxy-21-(trifluoroacetyl)progesterone. |
| 19. 11-keto-17α-hydroxyprogesterone | 19. 11-keto-17α-hydroxy-21-(trifluoroacetyl)progesterone. |
| 20. 9α-fluoro-11β,17α-dihydroxyprogesterone | 20. 9α-fluoro-11β,17α-dihydroxy-21-(trifluoroacetyl)progesterone. |

Acidification of a soluton, e.g., methanolec, ethanolic, aqueous, or the like, of an alkali-metal enolate of the present invention with hydrogen chloride, hydrochloric acid, sulfuric acid, acetic acid, or the like, is productive of a free 21-(trifluoroacetyl)-20-keto steroid. Filtering and drying, when water is the solvent for the alkali-metal enolate, or adding a large volume of water, filtering and then drying the precipitated solids, when methanol, ethanol, or the like, is the solvent, is productive of substantially pure free enol.

Treating any of these 20-keto-21-(trifluoroacetyl) steroids with a molar equivalent of iodine, followed by an excess of potassium acetate in methanol, in the manner described herein is productive of the corresponding 21-acetoxy compounds, most of which are known and/or physiologically active steroids or convertible thereto.

The conversion of the 20-keto-21-(trifluoroacetyl)steroids of the present invention to known and/or physiologically active steroids is specifically illustrated below starting with 11-keto-21-(trifluoroacetyl)progesterone.

3,11-diketo-4,17(20)-pregnadiene-21-oic acid methyl ester

To a solution of 6.57 grams (0.02 mole) of 11-ketoprogesterone in 100 milliliters of anhydrous tertiary butyl alcohol was added with stirring, in an atmosphere of nitrogen, 10.57 grams (0.08 mole) of ethyl trifluoroacetate and 2.70 grams (0.05 mole) of sodium methoxide dissolved in about 10.6 milliliters of methanol, at about fifty degrees centigrade, whereupon a yellow color appeared in the clear solution. The mixture was stirred for one hour, with the exclusion of moisture and atmospheric oxygen, whereafter a solution of 2.46 grams of anhydrous sodium acetate and three grams of glacial acetic acid in 160 milliliters of methanol was added to the solution containing the sodium enolate of 11-keto-21-(trifluoroacetyl)progesterone to produce the free enol.

This solution was cooled to between zero and five degrees centigrade with an ice bath and a solution of 6.72 grams (0.042 mole) of bromine in 67 milliliters of methanol was added during the next half hour with most of the solution being added in the first ten minutes. The amount of bromine to be added was determined by the color of the reaction mixture which progressively lightened during the course of the bromine addition until the solution was colorless. When the yellow bromine color appeared to persist for five minutes after a portion of the bromine solution was added, no further bromine was added.

To this solution was added 18.15 milliliters of a methanol solution of 4.62 grams (0.085 mole) sodium methoxide. The solution was stirred for 2.5 hours at room temperature and then poured with stirring into 1700 milliliters of ice and water. The resulting flocculant white precipitate was filtered and dried and found to weigh 6.72 grams, a yield of 94.2 percent of the theoretical.

Purified methyl 3,11-diketo-4,17(20)-pregnadiene-21-oate can be isolated from this precipitate in the following manner: dissolve the precipitate in 200 milliliters of benzene and pour over a chromatographic column of 150 grams of Florisil synthetic magnesium silicate. The column is then developed with 200 milliliter portions of solvent of the following composition and order: five of Skellysolve B hexane hydrocarbons plus five percent acetone and five of Skellysolve B plus ten percent acetone. The Skellysolve B plus ten percent acetone eluates are freed of solvent to give a 64 percent yield, calculated on the starting 11-ketoprogesterone, of methyl 3,11-diketo-4,17(20)-pregnadiene-21-oate.

Reacting the thus-produced 3,11-diketo-4,17(20)-pregnadiene-21-oic acid methyl ester with pyrrolidine in refluxing benzene, in the presence of para-toluenesulfonic acid, is productive of the corresponding 3-pyrrolidyl enamine which, upon reduction with lithium aluminum hydride in ether is converted to the 3-pyrrolidyl enamine of 11β,21-dihydroxy-4,17(20)-pregnadiene-3-one. This latter compound is readily hydrolyzed in ethanol in the presence of sodium hydroxide to 11β,21-dihydroxy-4,17(20)-pregnadiene-3-one which, when acetylated with acetic anhydride in pyridine, is converted to 11β-hydroxy-21-acetoxy-4,17(20)-pregnadiene-3-one. Oxidative hydroxylation of this latter compound with osmium tetroxide and hydrogen peroxide is productive of hydrocortisone acetate.

The conversion of 3,11-diketo-4,17(20)-pregnadiene-21-oic acid methyl ester to 11β,17α-dihydroxy-4,17(20)-pregnadiene-3-one via the 3-pyrrolidyl enamine is disclosed and claimed in the copending application of Magerlein and Hogg, S.N. 358,201, now abandoned.

21acetoxy-4-pregnene-3,11,20-trione

To a solution of 6.57 grams (0.02 mole) of 11-ketoprogesterone in 100 milliliters of anhydrous tertiary butyl alcohol was added, with stirring and under an atmosphere of nitrogen, 10.57 grams (0.08 mole) of ethyl trifluoroacetate and 2.70 grams of sodium methoxide at about fifty degrees centigrade. After fifteen minutes of stirring, the solution was cooled to 25 degrees centigrade and three grams of glacial acetic acid was added, followed by a solution of 5.08 grams (0.02 mole) of iodine dissolved in 100 milliliters of methanol, the latter being added over a period of ten minutes. The resulting dark solution was stirred for an additional 2.25 hours, during which time the solution became cloudy and brick-red. A solution of 39 grams of potassium acetate dissolved in 160 milliliters of methanol was then added whereupon the color of the solution turned to light yellow. After standing at about 25 degrees centigrade for sixteen hours, the mixture was poured into two liters of a mixture of ice and water. The amorphous precipitate was collected by filtration and dried in a vacuum desiccator. There was obtained 7.36 grams of solids.

A 1.5 gram portion of these solids dissolved in 130 milliliters of benzene and chromatographed over a column of eighty grams of Florisil synthetic magnesium silicate. The column was developed with 150 milliliter portions of solvents of the following composition and order: five of Skellysolve B hexane hydrocarbons plus ten percent acetone, five of Skellysolve B plus 12.5 percent acetone, ten of Skellysolve B plus twenty percent acetone and one of acetone. The solids in the third through seventh portions of Skellysolve B plus twenty percent acetone eluates consisted of 422 milligrams of 21-acetoxy-4-pregnene-3,11,20-trione (Kendall's Compound A acetate) melting at 176 to 178 degrees centigrade. The yield of 21-acetoxy-4-pregnene-3,11,20-trione from the 11-ketoprogesterone was therefore 27 percent of the theoretical.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of a 20-keto-21-(trifluoroacetyl)steroid which comprises the step of condensing, in the presence of an alkali-metal condensation catalyst and under essentially anhydrous conditions a steroid having a pregnane carbon skeleton and represented by the following formula:

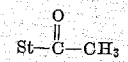

wherein the

group represents the 17-side chain thereof, with a lower alkyl trifluoroacetate to produce an alkali-metal enolate of a 20-keto-21-(trifluoroacetyl)steroid.

2. The process of claim 1 wherein the lower alkyl trifluoroacetate is selected from the group consisting of methyl and ethyl trifluoroacetate.

3. The process of claim 1 wherein the alkali-metal condensation catalyst is sodium methoxide.

4. A process for the production of an alkali-metal enolate of a 21-(trifluoroacetyl)-20-ketal steroid which comprises the step of condensing a steroid selected from the group consisting of (1) those represented by the following formula:

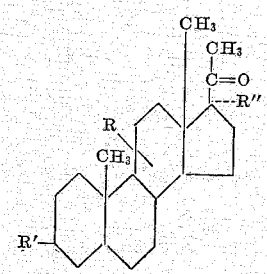

wherein R is selected from the group consisting of an 11-hydroxy group, an 11-acyloxy group, a 9:11-β-oxide, and an 11-ketonic oxygen, R' is selected from the group consisting of a hydroxy group, an acyloxy group, an etherified hydroxy group, and ketonic oxygen, and R'' is selected from the group consisting of hydrogen and hydroxy, and (2) corresponding compounds unsaturated at at least one of the 4(5), 5(6) and 9(11) positions, with a lower-alkyl trifluoroacetate, in the presence of an alkali-metal condensation catalyst under essentially anhydrous conditions, to produce an alkali-metal enolate of a 21-(trifluoroacetyl)-20-keto steroid.

5. The process of claim 4 wherein the alkali-metal condensation catalyst is an alkali-metal alkoxide.

6. A process for the production of the sodium enolate of 21-(trifluoroacetyl)progesterone which comprises: condensing progesterone, under essentially anhydrous conditions in the presence of a sodium alkoxide, with a lower alkyl trifluoroacetate, to produce the sodium enolate of 21-(trifluoroacetyl)progesterone.

7. The process of claim 6 wherein the lower alkyl trifluoroacetate is ethyl trifluoroacetate.

8. A process for the production of the sodium enolate of 11α-hydroxy-21-(trifluoroacetyl)progesterone which comprises: condensing 11α-hydroxyprogesterone, under essentially anhydrous conditions in the presence of a sodium alkoxide, with a lower alkyl trifluoroacetate, to produce the sodium enolate of 11α-hydroxy-21-(trifluoroacetyl)progesterone.

9. The process of claim 8 wherein the lower alkyl trifluoroacetate is ethyl trifluoroacetate.

10. A process for the production of the sodium enolate of 11β-hydroxy-21-(trifluoroacetyl)progesterone which comprises: condensing 11β-hydroxyprogesterone, under essentially anhydrous conditions in the presence of a sodium alkoxide, with an lower alkyl trifluoroacetate, to produce the sodium enolate of 11β-hydroxy-21-(trifluoroacetyl)progesterone.

11. The process of claim 10 wherein the lower alkyl trifluoroacetate is ethyl trifluoroacetate.

12. A process for the production of the sodium enolate of 11-keto-21-(trifluoroacetyl)progesterone which comprises: condensing 11-ketoprogesterone, under essentially anhydrous conditions in the presence of a sodium alkoxide, with an lower alkyl trifluoroacetate, to produce the sodium enolate of 11-keto-21-(trifluoroacetyl)progesterone.

13. The process of claim 12 wherein the lower alkyl trifluoroacetate is ethyl trifluoroacetate.

14. Compounds selected from the group consisting of (1) steroids represented by the following formula:

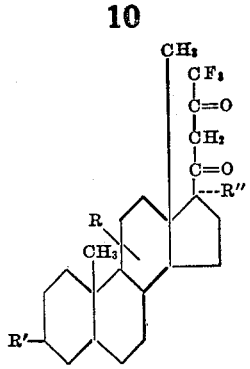

wherein R is a C-ring substituent selected from the group consisting of 11α- and 11β-hydroxy, 11 - and 11β-lower-acyloxy wherein the acyl radical is that of a hydrocarbon carboxylic acid containing from one to eight carbon atoms, inclusive, 11α-p-toluenesulfonyloxy, hydrogen, 9:11-β-oxide and 11-ketonic oxygen, R' is selected from the group consisting of 3α- and 3β-hydroxy, 3α- and 3β-lower-acyloxy wherein the acyl radical is that of a hydrocarbon carboxylic acid containing from one to eight carbon atoms, inclusive, and 3-ketonic oxygen, and R'' is selected from the group consisting of hydrogen and hydroxy, and (2) corresponding compounds unsaturated in at least one of the 4(5), 5(6) and 9(11) positions, and (3) the alkali-metal enoate of each of the above compounds.

15. 11-hydroxy-21-(trifluoroacetyl)progesterone alkali-metal enolate.

16. 11-keto - 21 - (trifluoroacetyl)progesterone alkali-metal enolate.

17. 11α-hydroxy-21-(trifluoroacetyl)progesterone sodium enolate.

18. 11β-hydroxy-21-(trifluoroacetyl)progesterone sodium enolate.

19. 11-keto - 21 - (trifluoroacetyl)progesterone sodium enolate.

20. 21-(trifluoroacetyl)progesterone sodium enolate.

References Cited in the file of this patent

UNITED STATES PATENTS

| | | |
|---|---|---|
| 2,683,722 | Hogg | July 13, 1954 |
| 2,683,724 | Hogg | July 13, 1954 |
| 2,698,852 | Beal | Jan. 4, 1955 |

OTHER REFERENCES

Fieser et al.: Natural Products Related to Phenanthrene, 3rd edition, pages 424–426 (1949).

UNITED STATES PATENT OFFICE
Certificate of Correction

Patent No. 2,884,429                             April 28, 1959

Alan H. Nathan et al.

It is hereby certified that error appears in the printed specification of the above numbered patent requiring correction and that the said Letters Patent should read as corrected below.

Column 2, lines 3 to 17 inclusive, the formula should appear as shown below instead of as in the patent:

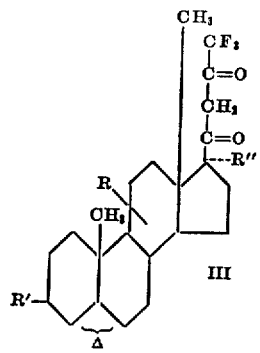

line 23, for "a 8(11)-double bond," read —a 9(11)-double bond,—; column 4, line 52, for "algali-metal" read "alkali-metal—; column 5, line 4, for "pergnadiene" read —pregnadiene—; column 5, line 66, for "methanolec" read —methanolic—; columns 5 and 6, in the table, first column thereof, sixth item, for "3α-hytroxypregnane-20-one" read —3α-hydroxypregnane-20-one—.

Signed and sealed this 20th day of October 1959.

[SEAL]

Attest:
KARL H. AXLINE,
*Attesting Officer.*

ROBERT C. WATSON,
*Commissioner of Patents.*